United States Patent [19]

Kraetschmer

[11] Patent Number: 4,837,072
[45] Date of Patent: Jun. 6, 1989

[54] EMBOSSING FOIL

[75] Inventor: Horst Kraetschmer, Seukendorf, Fed. Rep. of Germany

[73] Assignee: Leonard Kurz GmbH & Co., Fuerth/Bavaria, Fed. Rep. of Germany

[21] Appl. No.: 52,775

[22] Filed: May 21, 1987

[30] Foreign Application Priority Data

Jun. 14, 1986 [DE] Fed. Rep. of Germany ....... 8616114

[51] Int. Cl.⁴ .......................... B32B 7/06; B32B 7/12; B32B 15/08; C09J 7/02
[52] U.S. Cl. ..................................... 428/201; 428/202; 428/209; 428/213; 428/336; 428/343; 428/354; 428/458; 428/480; 428/913; 428/914
[58] Field of Search ...................... 428/30, 31, 40, 209, 428/458, 480, 156, 187, 343, 354, 201, 202, 913, 914

[56] References Cited

U.S. PATENT DOCUMENTS

| 176,730 | 5/1876 | Aickin | 428/30 |
| 3,689,346 | 9/1972 | Powland | 428/30 X |
| 3,944,692 | 3/1976 | Swenson | 428/40 |
| 4,101,698 | 7/1978 | Dunning et al. | 428/31 |
| 4,618,518 | 10/1986 | Pricane et al. | 428/30 X |

FOREIGN PATENT DOCUMENTS 3248670 7/1984 Fed. Rep. of Germany ...... 428/480

Primary Examiner—Thomas J. Herbert
Attorney, Agent, or Firm—Louis E. Marn

[57] ABSTRACT

An embossing foil such as a hot embossing foil includes a backing foil which is a thermoplastic polyester triple-layer foil comprising a central polyester layer which has a lower melting point than the other two polyester layers on respective sides thereof, and a decorative layer on the backing foil, comprising at least one layer of lacquer and possibly an adhesive layer. Provided at the surface of the backing foil which is towards the decorative layer is a three-dimensional patterning.

21 Claims, 1 Drawing Sheet

EMBOSSING FOIL

BACKGROUND OF THE INVENTION

This invention relates generally to embossing foils and more particularly but not exclusively to hot embossing foils.

In one form of embossing foil, the foil comprises a carrier or backing foil and a decorative layer thereon. The decorative layer may comprise at least one layer of lacquer and optionally a layer of adhesive. A separation or partition layer may be provided between the backing foil and the layer of lacquer, to promote separation thereof, while a metal or color layer may be disposed between the layer of lacquer and the adhesive layer. Now, in regard to such foils, there is frequently a desire to provide for a decorative configuration thereof, in a specific manner. The decorative configuration of the foil may be produced for example by the backing foil being suitably scratched or marked at its surface, on the side of the backing foil which is towards the decorative layer, thereby to provide a three-dimensional patterning effect. However such a foil provides for orientation of the patterning effect in the longitudinal direction of the foil.

In another form of foil, as disclosed for example in German laid-open application (DE-OS) No. 26 49 479, while it is possible for the foil to have a spatial patterning effect which is independent of a given orientation of the embossing foil, in that case the patterning effect is not provided on the side of the backing foil which is towards the decorative layer thereon, that is to say, when the backing foil has been removed, on the top side of the decorative layer after it has been fixed to a suitable support on which it is to be disposed, but rather the patterning is provided between the layer of lacquer and the adhesive layer, within the actual decorative layer. That means that the optical effect which can be achieved with such a foil still leaves something to be desired.

SUMMARY OF THE INVENTION

An object of the present invention is to provide an embossing foil which permits three-dimensioning patterning thereon which is independent of a given orientation of the embossing foil.

Another object of the present invention is to provide an embossing foil wherein three-dimensional patterning is to be found on the top side of the decorative layer which is towards the backing foil, and not in the interior of the decorative layer.

Yet another object of the present invention is to provide a hot embossing foil which provides an improved visual effect in comparison with prior foils.

Still a further object of the present invention is to provide an embossing foil which is adapted to be provided with very fine patterning effects.

Yet a further object of the present invention is to provide a hot embossing foil which can be readily and conveniently varied in regard to its structure to provide varying visual effects.

In accordance with the present invention, those and other objects are attained by an embossing foil such as a hot embossing foil, which comprises a backing foil carrying a decorative layer thereon. The decorative layer comprises at least one layer of lacquer and optionally an adhesive layer, with a separating or partitioning layer between the backing foil and the layer of lacquer to provide for ready separation thereof. A further layer which may be a metal layer or a suitable coloring layer is provided between the layer of lacquer and the adhesive layer. The backing foil is a thermoplastic composite layer consisting of a sandwich of an outer polyester layer, a central polyester layer and an inner polyester layer, the inner polyester layer thus providing the part of the backing foil which is towards and in contact with the separating layer between the backing foil and the layer of lacquer. The central polyester layer of the backing foil sandwich has a lower melting point than the outer and inner polyester layers on respective sides thereof. A three-dimensional patterning is provided at the inside surface of the backing foil, which is towards the decorative layer.

Thus, the backing foil comprises two outwardly disposed polyester layers which sandwich between them a central polyester layer having a lower melting point. The central polyester layer can be subjected to an embossing effect at higher temperatures and, with a heat treatment which may be necessary in terms of the technical aspects of the situation of use thereof, substantially retains the predetermined embossing depth. The outer and inner polyester layers which are diposed on respective sides of the central layer preferably comprise polyethylene terephthalate. The central layer preferably comprises a co-polyester containing between 5 and 95% by weight of ethylene isophthalate units. The backing foil may be more particularly a co-extruded triple-layer foil.

In a preferred feature of the embossing foil according to the principles of the present invention, the central polyester layer is preferably between about 4 $\mu$m and 10 $\mu$m in thickness. With a foil thickness in that range, it is satisfactorily possible to produce structural image configurations, that is to say, a spatial patterning, which enjoys sharp contours, on the backing foil, by means of an embossing calander or a similar machine having a roller which has an engraved surface and which may be heated. In order to provide for durable embossing of the backing foil, it has been found advantageous for the surface of the embossing roller to be heated to a temperature of about 160° to 200° C. When using an embossing calander of that kind, or a similar machine, it is possible for any desired engraved patterning to be durably embossed on the inward surface of the backing foil, that is to say the surface thereof which is towards the decorative layer, prior to the application of the decorative layer to the backing foil. The patterning may be for example geometrical lines, a wood grain effect, a stone-like or brick-like effect, and the like.

In a further advantageous feature of the invention, the central deformable polyester layer of the backing foil sandwich is about 7.5 $\mu$m in thickness. After the operation of embossing the patterning effect on the backing foil, a decorative layer is applied to the surface of the backing foil in per se known manner, and is then provided with the negative of the patterning on the backing foil. After the operation of embossing the foil in position, that is to say, after the decorative layer has been applied to a support on which it is to be disposed and after the backing foil has been stripped from the decorative layer which has been fixed to its support, the spatial patterning is at the free or exposed surface of the decorative layer, so that the embossed foil affords a pleasing visual impression.

In a preferred feature of the foil according to the invention, the inner polyester layer of the backing foil, which is thus the layer of the sandwich composition which is towards the decorative layer, is thinner than the outer polyester layer which is thus on the other side of the central layer from the first-mentioned inner polyester layer. A backing foil configuration of that nature gives the advantage that its tendency to adhere to the embossing calander during the operation of producing the spatial patterning is minimized so that the operation of embossing the patterning on the backing foil can be carried out at a relatively high speed of feed movement of the backing foil through the machine.

Preferably, the thickness of the backing foil is between about 24 $\mu$m and 30 $\mu$m in thickness. A backing foil of a thickness of 27.5 $\mu$m has been found to be particularly appropriate.

In a preferred feature of the invention, the spatial or three-dimensional patterning may be the negative representation of an engraving pattern. Very fine three-dimensional patterning effects can be achieved in that way so that for example a wood grain effect can be simulated with a high degree of fidelity to a natural wood grain.

Further objects, features and advantages of the present invention will be apparent from the following description of preferred embodiments thereof.

DESCRIPTION OF PREFERRED EMBODIMENTS

Figure 1:
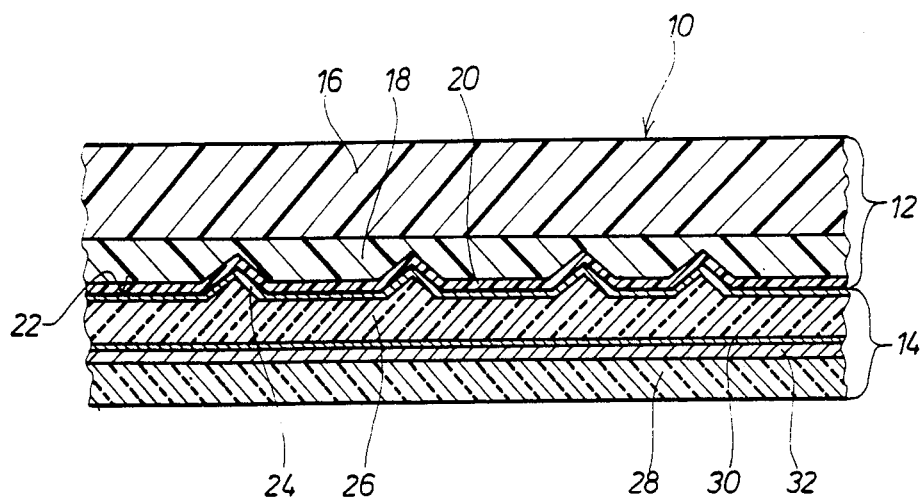
FIG. 1 is a view in longitudinal section through a part of an embossing foil according to the invention which is shown on an enlarged scale, with the thicknesses of the respective foils and layers making up the embossing foil not being in their true relationship of scale relative to each other.

Referring firstly to FIG. 1, shown therein is part of an embossing foil which is indicated generally by reference numeral 10, for example a hot embossing foil. The embossing foil 10 comprises a carrier or backing foil 12 and a decorative layer 14 carried thereon. The backing foil 12 is in the form of a thermoplastic polyester triple-layer foil sandwich comprising an outer polyester layer 16, a central polyester layer 18 and an inner polyester layer 20. The terms outer and inner are in relation to the decorative layer 14, in other words, the inner layer 20 is the layer which is towards the decorative layer 14 while the outer layer 16 is most remote from the decorative layer 14 and thus forms the outside surface of the backing foil 12.

The thickness of the backing foil 12 is in the range of between about 24 $\mu$m and 30 $\mu$m, and is preferably about 27.5 $\mu$m.

The inner polyester layer 20 which is towards the decorative layer 14 is thinner than the outer polyester layer 16. The central polyester layer 18 is between about 4 $\mu$m and 10 $\mu$m in thickness, preferably about 7.5 $\mu$m in thickness. Provided at the inside surface 22 of the backing foil 12, which is towards the decorative layer 14, is a spatial or three-dimensional patterning which is of a depth than is greater than the thickness of the inner polyester layer 20. The thickness of the inner polyester layer 20 is of the order of magnitude of 1 $\mu$m.

Reference numeral 24 in FIG. 1 denotes a separating or partition layer which is of a thickness of the order of magnitude of 0.1 $\mu$m. The layer 24 permits the backing foil to be easily peeled off the decorative layer 14 after the decorative layer 14 has been suitably fixed to a support on which it is to be positioned, directly following the embossing operation for fixing the decorative layer 14 in position.

As can be clearly seen from FIG. 1, the decorative layer 14 comprises a layer of lacquer 26 which adjoins the layer 24, and an adhesive layer 28 which thus forms the outside surface of the decorative layer 14, to be applied to its support. Provided between the layer 26 and the layer 28 are a metal layer 30 and a bonding layer 32. The layer 26 comprises a transparent lacquer and is of the order of magnitude of 2 $\mu$m in thickness while the metal layer 30 adjoining the lacquer layer 26 is what is referred to as a thin film layer which may be applied to the layer 26 to cling thereto for example by cathode sputtering, vacuum vapor deposit or the like. The metal layer 30 is advantageously of a thickness of the order of magnitude of $5.10^{-2}$ $\mu$m.

The bonding layer 32 serves to provide a mechanically strong join between the metal layer 30 and the adhesive layer 28. The thickness thereof is of the order of magnitude of 0.1 $\mu$m while the layer 28 is of the order of magnitude of 2 to 3 $\mu$m in thickness.

Figure 2:
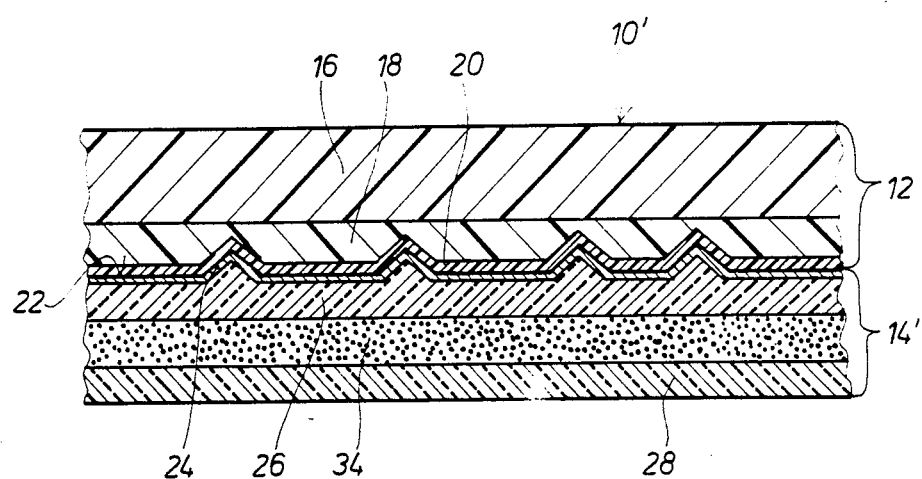
FIG. 2 is a view similar to that shown in FIG. 1 of part of an embossing foil comprising a color layer in place of a metal layer and a bonding layer.

Reference will now be made to FIG. 2 showing a further embodiment of an embossing foil as indicated generally by reference numeral 10′, comprising a carrier or backing foil 12 and a decorative layer 14. The backing foil 12 is of the same nature as that shown in FIG. 1 so that there is no need at this point to repeat the foregoing description of the outer polyester layer 16, the central polyester layer 18 and the inner polyester layer 20. Reference numeral 22 in FIG. 2 again denotes the inside surface of the backing foil 12 which is provided with a three-dimensional patterning. The inside surface 22 is again provided with a separating or partition layer 24 which is of a thickness of the order of magnitude of 0.1 $\mu$m.

The decorative layer 14′ in the FIG. 2 embodiment comprises a lacquer layer 26 adjoining the layer 24, a color layer 34 adjoining the layer 26 and an adhesive layer 28 adjoining the layer 34. The layer 34 is of a thickness of the order of magnitude of 3 $\mu$m. The layer 34 may be of a single-color nature, thus providing what may be referred to as a unicolor embossing foil, whereas the embossing foil shown in diagrammatic form in FIG. 1 is what may be referred to as a metallized foil, due to the presence of the metal layer 30 therein.

It will be appreciated that the above-described embossing foils have been set forth solely by way of example and illustration of the present invention and various other modifications and alterations may be made therein without thereby departing from the spirit and scope thereof.

I claim:
1. An embossing foil, which comprises:
   a decorative layer comprising at least a layer of lacquer and a layer of adhesive;
   a further layer between said lacquer layer and said adhesive layer, said further layer comprising a metal layer or a color layer; and
   a thermoplastic polyester triple-layer backing foil formed of outer, central and inner polyester layers, said central polyester layer having a lower melting point than said outer and inner polyester layers, an inside surface of said backing foil having a three-dimensional patterning disposed towards said decorative layer.

2. An embossing foil as set forth in claim 1 wherein said further layer is a metal layer.

3. An embossing foil as set forth in claim 1 wherein said further layer is a color layer.

4. An embossing foil as set forth in claim 1 wherein said inner polyester layer of said backing foil is thinner than said outer polyester layer.

5. An embossing foil as set forth in claim 1 wherein said three-dimensional patterning is the negative representation of an engraving.

6. An embossing foil as set forth in claim 1 wherein said central polyester layer is between about 4 μm and 10 μm in thickness.

7. An embossing foil as set forth in claim 6 wherein said central polyester layer is about 7.5 μm in thickness.

8. An embossing foil as set forth in claim 1 wherein said backing foil is between about 24 μm and 30 μm in thickness.

9. An embossing foil as set forth in claim 8 wherein said backing foil is about 27.5 μm in thickness.

10. An embossing foil, which comprises:
a backing foil comprising first, second and third thermoplastic polyester layers in a sandwiched construction, said first layer defining a first surface of said backing foil and said third layer defining a second surface of said backing foil, said second layer disposed between said first and third layers having a lower melting point than said first and third layers, said second surface of said backing foil having a three-dimensional patterning;
a separating layer on said second surface of said backing foil; a decorative layer composition on said separating layer comprised of a layer of lacquer adjoining said separating layer, a further layer on said lacquer layer and an adhesive layer on said further layer for securing said decorative layer to a surface, said further layer comprising a metal layer or a color layer.

11. An embossing foil as set forth in claim 10 wherein said further layer is a metal layer.

12. An embossing foil as set forth in claim 10 wherein said further layer is a color layer.

13. An embossing foil, which comprises:
a decorative layer comprising at least a layer of lacquer;
a further layer disposed on said lacquer layer, said further layer comprising a metal layer or a color layer; and
a thermoplastic polyester triple-layer backing foil formed of outer, central and inner polyester layers, said central polyester layer having a lower melting point than said outer and inner polyester layers, an inside surface of said backing foil having a three-dimensional patterning disposed towards said decorative layer.

14. An embossing foil as set forth in claim 13 wherein said further layer is a metal layer.

15. An embossing foil as set forth in claim 13 wherein said further layer is a color layer.

16. An embossing foil as set forth in claim 13 wherein said inner polyester layer of said backing foil is thinner than said outer polyester layer.

17. An embossing foil as set forth in claim 13 wherein said three-dimensional patterning is the negative representation of an engraving.

18. An embossing foil as set forth in claim 13 wherein said central polyester layer is between about 4 μm and 10 μm in thickness.

19. An embossing foil as set forth in claim 18 wherein said central polyester layer is about 7.5 μm in thickness.

20. An embossing foil as set forth in claim 13 wherein said backing foil is between about 24 μm and 30 μm in thickness.

21. An embossing foil as set forth in claim 20 wherein said backing foil is about 27.5 μm in thickness.

* * * * *